United States Patent
Roberts et al.

(10) Patent No.: US 7,929,106 B2
(45) Date of Patent: Apr. 19, 2011

(54) LIQUID CRYSTAL DISPLAY COMPRISING A VOID REGION AND METHOD OF MANUFACTURING SAME

(75) Inventors: Ralph R. Roberts, Cottage Grove, MN (US); Amy J. Hite, Cottage Grove, MN (US); Jane K. Wardhana, St. Paul, MN (US); Audrey A. Sherman, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 450 days.

(21) Appl. No.: 11/955,656

(22) Filed: Dec. 13, 2007

(65) Prior Publication Data

US 2009/0153756 A1 Jun. 18, 2009

(51) Int. Cl.
*C09K 19/02* (2006.01)
*G02F 1/1339* (2006.01)
(52) U.S. Cl. ........................................ 349/183; 349/153
(58) Field of Classification Search .................. 349/153, 349/158, 190, 122, 155, 93, 86, 88, 35, 183, 349/185, 182
See application file for complete search history.

(56) References Cited

U.S. PATENT DOCUMENTS

| | | | |
|---|---|---|---|
| 5,691,795 A * | 11/1997 | Doane et al. .................. | 349/169 |
| 5,699,139 A | 12/1997 | Aastuen et al. | |
| 5,739,888 A * | 4/1998 | Ogura et al. .................. | 349/153 |
| 6,128,056 A * | 10/2000 | Kubota et al. .................. | 349/86 |
| 6,392,725 B1 * | 5/2002 | Harada et al. .................. | 349/74 |
| 6,555,235 B1 | 4/2003 | Aufderheide et al. | |
| 7,440,070 B2 * | 10/2008 | Seok et al. ...................... | 349/153 |
| 7,623,215 B2 * | 11/2009 | Motomatsu .................... | 349/190 |
| 2004/0036832 A1 | 2/2004 | Momose | |
| 2004/0207797 A1 | 10/2004 | Sakurada | |
| 2005/0224935 A1 * | 10/2005 | Schaepkens et al. ......... | 257/678 |
| 2007/0277659 A1 | 12/2007 | Schneider et al. | |

FOREIGN PATENT DOCUMENTS

| | | |
|---|---|---|
| JP | 61-130924 | 6/1986 |
| JP | 11-508708 | 7/1999 |
| KR | 10-2002-0014165 | 2/2002 |

OTHER PUBLICATIONS

Khan, et al., SID Symposium Digest, 2004. vol. 35, p. 886-889.
Yang et al., Ann. Rev. Mater, Sci. 1997, vol. 27, pp. 117-146.
Roberts, et al.,"Pre-polymer Formulations for Cholesteric Liquid Crystal Displays", Filed, Nov. 8, 2006.

* cited by examiner

*Primary Examiner* — Thoi V Duong
(74) *Attorney, Agent, or Firm* — Elizabeth A. Gallo (57) ABSTRACT

A liquid crystal display is disclosed, including first and second opposing substrates separated by a cell gap. The cell gap has an inner liquid crystal region including a liquid crystal composition, an outer sealant region including a sealant that bonds the first and second opposing substrates together, and a void region between the inner liquid crystal region and the outer sealant region. The sealant may be a pressure sensitive adhesive. Also disclosed is a method of manufacturing the liquid crystal display. A liquid crystal display assembly including at least two light reflecting liquid crystal displays is also disclosed, wherein at least one of the displays comprises the liquid crystal display disclosed herein.

12 Claims, 1 Drawing Sheet

LIQUID CRYSTAL DISPLAY COMPRISING A VOID REGION AND METHOD OF MANUFACTURING SAME

FIELD OF INVENTION

This disclosure relates to liquid crystal displays, particularly cholesteric liquid crystal displays, and to methods of manufacturing such displays.

BACKGROUND

Devices employing liquid crystals (LCs) have found use in a variety of electrooptical applications, in particular those which require compact, energy-efficient, voltage-controlled light valves, e.g., watch and calculator displays, as well as the flat-panel displays found in portable computers and compact televisions. Liquid crystal displays have a number of unique characteristics, including low voltage and low power of operation, which make them good candidates for use in non-emissive electrooptical display applications.

Polymer dispersed liquid crystal (PDLC) and polymer stabilized liquid crystal (PSLC) technologies have received much attention because of their potential utility for display applications. The polymerization of a cholesteric liquid crystal (ChLC)/monomer mixture at a temperature at which the ChLC and monomer are soluble but the resulting ChLC/polymer mixture is insoluble is described as polymerization induced phase separation (PIPS). The ChLC/monomer mixture is applied between two substrates, each having a conductive inner surface coating of a transparent conductor such as indium tin oxide (ITO). The monomer is then cured to give the ChLC cell. Application of an electric field (E) across the cell causes the ChLC to be aligned in either the planer (reflective) state phase or the focal conic (light scattering) phase. Both of these states are stable at E=0 which means that the textures are "locked in" and remain intact until acted upon again (i.e. the device is bistable). The reflected wavelength ($\lambda$) is controlled by formulating the ChLC with a chiral dopant of specific helical twisting power (HTP) at a concentration (c) where the helical pitch ($P_o$) is given by $$P_o = [(c)(HTP)]^{-1}$$

ChLC display technology may be useful in indoor applications such as retail point-of-purchase displays as well as for large format outdoor signage. However, outdoor applications require display panels with consistent color rendition over prolonged exposure to the environment. Thus, for ChLC display technology to be useful in outdoor applications, materials must be color stable under a wide variety of conditions, i.e., there should be no change in $P_o$ with time.

SUMMARY

In one aspect, a liquid crystal display is disclosed herein. The liquid crystal display comprises first and second opposing substrates that are separated by a cell gap, the cell gap comprising: an inner liquid crystal region comprising a liquid crystal composition, an outer sealant region comprising a sealant that bonds the first and second opposing substrates together, and a void region between the inner liquid crystal region and the outer sealant region. In some embodiments, an inner cell gap is formed by the inner liquid crystal region, an outer cell gap is formed by the outer sealant region, and the outer cell gap is greater than or equal to the inner cell gap.

In some embodiments, the sealant comprises a pressure sensitive adhesive. The sealant may also comprise a photocurable or thermally curable material. In some embodiments, the liquid crystal composition comprises a cholesteric liquid crystal material, which may be photocurable or thermally curable. The sealant and/or the liquid crystal composition may comprise particles. In some embodiments, the first and second substrates may be polymeric substrates, glass, or a combination thereof. Conductive traces of a conductive material may be present on the surfaces of the substrates that oppose each other.

In another aspect, a method of manufacturing a liquid crystal display is disclosed herein. The method may comprise: providing first and second substrates; adhering the first and second substrates together using a sealant, wherein the first and second substrates are separated by a cell gap; disposing a liquid crystal composition into the cell gap such that the liquid crystal composition does not contact the sealant. The method may further comprise curing the liquid crystal composition in cases where a photocurable or thermally curable liquid crystal composition is used. The method may employ a roll-to-roll apparatus.

In yet another aspect, a liquid crystal display assembly is disclosed herein. The assembly may comprise at least two light reflecting liquid crystal displays of different color, wherein at least one of the displays comprises the liquid crystal display disclosed herein.

These and other aspects of the invention are described in the detailed description below. In no event should the above summary be construed as a limitation on the claimed subject matter which is defined solely by the claims as set forth herein.

BRIEF DESCRIPTION OF THE DRAWINGS

The invention may be more completely understood in consideration of the following detailed description in connection with the following figures.

DETAILED DESCRIPTION

The liquid crystal display may provide one or more advantages. For one, the liquid crystal display comprises a liquid crystal composition that exhibits little or no color shifting over time, even after being exposed to elevated temperatures and humidity for many hours. The liquid crystal device may exhibit little or no color shifting even after being exposed to elevated temperatures and humidity for many hours, wherein the conditions are designed to simulate outdoor conditions. As such, the liquid crystal display may be suitable for use in outdoor applications such as retail point-of-purchase displays and large format signage. In addition to little or no color shifting, the liquid crystal display exhibits minimal, if any, loss in contrast ratio.

The liquid crystal display disclosed herein may be advantageous because it can be manufactured using a variety of materials. For example, the liquid crystal composition can be made of commercially available materials, and the sealant can be any of a variety of known sealants such as pressure sensitive adhesives. The substrates used to manufacture the device can be any of a variety of substrates, such as those known in the art of making liquid crystal displays. If desired, the liquid crystal display disclosed herein can be manufactured using specially designed materials and substrates. In addition, the liquid crystal composition can be of any color reflecting material.

The liquid crystal device disclosed herein may be advantageous in that it can be manufactured using conventional equipment. For example, conventional lamination and curing equipment can be used. The liquid crystal device manufacturing process is also amenable to roll-to-roll processes designed to handle flexible substrates. The use of conventional equipment can help to keep manufacturing costs low.

Figure 1:
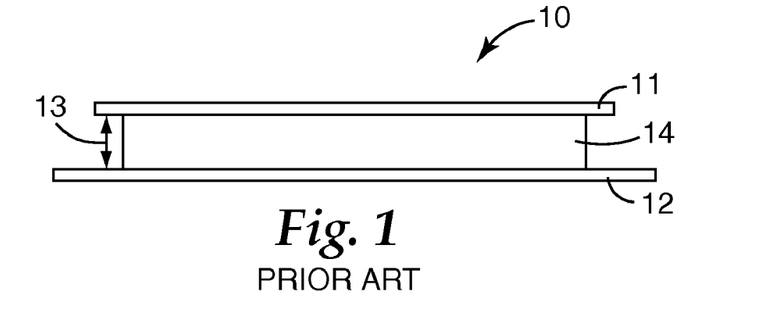
FIG. 1 shows a cross sectional view of a known liquid crystal display.

FIG. 1 shows a cross sectional view of a known liquid crystal display. Liquid crystal display 10 comprises first and second opposing substrates, 11 and 12, respectively, and that are separated by cell gap 13. Disposed between the two substrates is liquid crystal composition 14. The liquid crystal composition may comprise particles that can be used to determine or "set" the cell gap, and accordingly, are sometimes referred to as spacer beads. Liquid crystal display 10 does not employ sealing at the edges or perimeter, and typically exhibits undesirable color shifts and/or large changes in contrast ratio.

Figure 2:
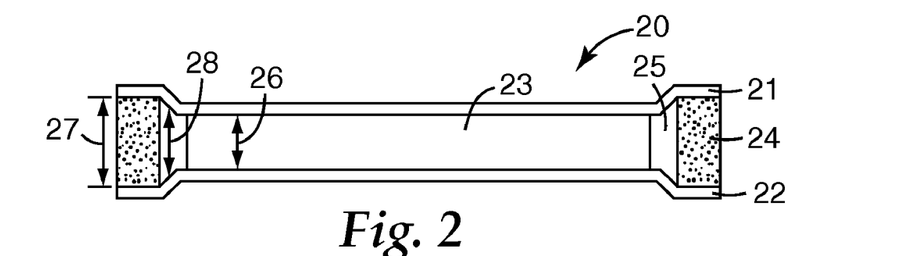
FIGS. 2-4 show cross sectional views of exemplary liquid crystal displays.

FIG. 2 shows a cross sectional view of exemplary liquid crystal display 20 which comprises first and second opposing substrates, 21 and 22, respectively. Disposed between the two substrates is liquid crystal composition 23. Also disposed between the two substrates is sealant 24. The cell gap comprises three regions. One is an inner liquid crystal region occupied by the liquid crystal composition and having an inner cell gap 26. Second is an outer sealant region occupied by the sealant and having outer cell gap 27. Third is void region 25 disposed between the inner liquid crystal region and the outer sealant region and having void cell gap 28.

The first and second opposing substrates are disposed opposite each other such that a cell gap is formed between them. Typical cell gaps may be anywhere from about 1.5 µm to about 200 µm depending on any number of factors described below. The cell gap may be essentially a single distance, or the distance may vary. The cell gap is made up of an inner cell gap formed by the inner liquid crystal region, an outer cell gap formed by the outer sealant region, and a void cell gap formed by a void region. The void region is disposed between the inner liquid crystal region and the outer sealant region. In some embodiments, the cell gap may be the same for all three regions. In other embodiments, two different cell gaps may exist, e.g., the inner cell gap and the void cell gap may be the same, with a smaller or larger outer cell gap. In other embodiments, two different cell gaps may exist, wherein the void cell gap and the outer cell gap may be the same, with a smaller or larger inner cell gap. In yet other embodiments, the void cell gap may vary for a given display. An example of this latter configuration is shown in FIG. 2 in which the inner cell gap and the outer cell gap are different, and the void cell gap varies.

A liquid crystal composition is disposed between the first and second substrates and generally fills the region of the cell gap referred to as the inner liquid crystal region. The extent to which the cell gap is filled is not particularly limited, so long as a void region exists between the liquid crystal composition and the sealant. The amount of void region necessary may depend on the particular design of the cell, the materials used, and the desired performance of the cell in a particular environment. For example, the amount of void region necessary may depend on how much sealant is present in the outer sealant region, as well as how much area the outer sealant region occupies. As discussed below, several different configurations exist for sealing the cell, and the type of configuration may also affect how much void region is necessary. The amount of void region necessary may also depend on the particular materials used as the substrates, any coatings on the substrates, the liquid crystal composition, and the sealant. Larger void regions may be necessary for liquid crystal compositions that are less stable under particular conditions as compared to other materials, and some sealants may seal more effectively than others.

One way to determine the amount of void region necessary is to subject the cell to appropriate environmental testing, typically elevated temperature and humidity conditions. Color shifts can be measured by recording reflectance spectra of the planar texture both before and after testing. For a given display, the amount of color shifting can then be used to decide if the void region is adequate, depending on acceptable product specifications. For example, elevated temperature and humidity conditions may comprise an environment of 85° C./85% relative humidity (RH) for at least about 300 hours. Elevated temperature conditions may comprise at least about 100 hours at 100° C., or 10 hours at 120° C.

The first and second opposing substrates can comprise any useful material such as, for example, polymeric substrates, glass, ceramics, metals, metal oxides, or a combination thereof. The first and second opposing substrates may comprise a combination of a polymer substrate and glass, i.e., one may be a polymeric substrate, and the other substrate glass. In some embodiments, one or both substrates can be transparent to visible light. In other embodiments, one substrate is transparent to visible light and the other can reflect visible light; this combination of substrates is typically used in reflective displays. In some embodiments, the first and second substrates are formed from a suitable polymeric material that has sufficient mechanical properties such as strength and flexibility to be processed on a roll-to-roll apparatus. By roll-to-roll, what is meant is a process where material is wound onto or unwound from a support, as well as further processed in some way. Examples of further processes include coating, slitting, blanking, laminating, and exposing to radiation, or the like.

The substrate can include multiple layers of material such as a support layer, a primer layer, a hard coat layer, a decorative design, and the like. The substrate can be permanently or temporarily attached to an adhesive layer. For example, a release liner can be temporarily attached and then removed for attachment of the adhesive layer to another substrate. The substrate can have a variety of functions such as, for example, providing flexibility, rigidity, strength or support, reflectivity, antireflectivity, polarization, or transmissivity (e.g., selective with respect to different wavelengths). That is, the substrate can be flexible or rigid; reflective or non-reflective; visibly clear, colored but transmissive, or opaque (e.g., not transmissive); and polarizing or non-polarizing.

Examples of polymers that may be used as the first and second substrates include thermoplastic polymers such as polyolefins, poly(meth)acrylates, polyamides, polyimides, polycarbonates, polyesters, and biphenol- or naphthalene-based liquid crystal polymers. Further examples of useful thermoplastics include polyethylene, polypropylene, polystyrene, poly(methylmethacrylate), polycarbonate of bisphenol A, poly(vinyl chloride), polyethylene terephthalate (PET), polyethylene naphthalate, and poly(vinylidene fluoride). Some of these polymers also have optical properties (e.g., transparency) that make them especially well-suited for certain display applications wherein they would support a patterned conductor, such as polycarbonates, polyimides, and/or polyesters. As used herein, "(meth)acrylate" is used to refer to both acryl and methacryl groups.

The first and second substrates may be flexible. The first and second substrates may have any useful thickness, ranging from about 5 µm to about 1000 µm, from about 25 µm to about 500 µm, from about 50 µm to about 250 µm, or from about 75 µm to about 200 µm.

The first and second substrates may each comprise a conductive material on an inner surface thereof. That is, the first substrate may comprise a first conductive material on a first inner surface thereof, and the second substrate may comprise a second conductive material on a second inner surface thereof, wherein the first and second inner surfaces are opposing surfaces. The conductive material may be present on either or both of the substrates in the form of a continuous coating thereon; alternatively, the conductive material may be present in the form of a discontinuous coating or pattern such that the surface(s) can be conductive. The pattern of the conductor may depend in part on the type of display and design parameters, such as size of end user display, etc.

The conductive continuous or discontinuous layer may be a transparent coating, for example, transparent to visible light. Useful conductive materials include indium tin oxide (ITO), tin antimony oxide, and zinc oxide. In some embodiments, the conductive continuous or discontinuous layer has a generally uniform sheet resistivity. The conductive continuous or discontinuous layer can have any useful thickness such as, for example, a thickness of from about 10 to about 100 nm. The thickness of the conductive continuous or discontinuous layer may be limited if transparency is required, depending on the particular material being used. The conductive inner surfaces can be formed in any useful manner such as, for example, sputtering, chemical vapor deposition and the like.

The liquid crystal composition may comprise any type of components that exhibit liquid crystallinity. In some embodiments, the liquid crystal composition comprises a cholesteric liquid crystal material. Cholesteric liquid crystal materials generally include compounds with molecular units that are chiral in nature (e.g., molecules that do not possess a mirror plane) and molecular units that are mesogenic in nature (e.g., molecules that exhibit liquid crystal phases). Cholesteric liquid crystal materials can be polymers. Cholesteric liquid crystal materials may also include achiral liquid crystal compounds (nematic) mixed with or containing a chiral unit. Cholesteric liquid crystal materials include compounds having a cholesteric liquid crystal phase in which the director (the unit vector that specifies the direction of average local molecular alignment) of the liquid crystal rotates in a helical fashion along the dimension perpendicular to the director. Cholesteric liquid crystal materials are also referred to as chiral nematic liquid crystal materials. The pitch of the cholesteric liquid crystal material is the distance (in a direction perpendicular to the director and along the axis of the cholesteric helix) that it takes for the director to rotate through 360 degrees. This distance is generally 100 nm or more.

The pitch of a cholesteric liquid crystal material can be induced by mixing or otherwise combining (e.g., by copolymerization) a chiral compound with a nematic liquid crystal compound. The cholesteric phase can also be induced by a chiral non-liquid crystal material. The pitch may depend on the relative ratios by weight of the chiral compound and the nematic liquid crystal compound or material. The helical twist of the director results in a spatially periodic variation in the dielectric tensor of the material, which in turn gives rise to the wavelength selective reflection of light. For example, the pitch can be selected such that the Bragg reflection is peaked in the visible, ultraviolet, or infrared wavelength regimes of light.

Cholesteric liquid crystal materials, including cholesteric liquid crystal polymers, are generally known and typically any of these materials can be used. Examples of suitable cholesteric liquid crystal polymers are described in U.S. Pat. Nos. 4,293,435; 5,332,522; 5,886,242; 5,847,068; 5,780,629; and 5,744,057. Other cholesteric liquid crystal materials can also be used. A cholesteric liquid crystal material may be selected for a particular application or optical body based on one or more factors including, for example, refractive indices, surface energy, pitch, processability, clarity, color, low absorption in the wavelength of interest, compatibility with other components (e.g., a nematic liquid crystal compound, etc.), molecular weight, ease of manufacture, availability of the liquid crystal compound or monomers to form a liquid crystal polymer, rheology, method and requirements of curing, ease of solvent removal, physical and chemical properties (for example, flexibility, tensile strength, solvent resistance, scratch resistance, and phase transition temperature), and ease of purification.

The liquid crystal composition may comprise a photocurable or thermally curable composition. In some embodiments, the liquid crystal composition comprises a ChLC/monomer prepolymer composition that may be cured via radiation in a range of from about 0.1 to about 10 mW/cm² or from about 0.2 to about 3 mW/cm². The resulting cured composition comprises a ChLC/polymer composition. As used herein, "liquid crystal composition" refers to both the prepolymer composition and the resulting cured composition.

The prepolymer composition is formed by a process in which the prepolymer composition and a liquid crystal material are mixed and the one or more monomers polymerized. In some embodiments, the prepolymer composition forms a single phase, and as the composition polymerizes, the polymer separates from the liquid crystal forming liquid crystal domains (e.g., droplets) dispersed within a polymer matrix. This phase separation process is termed polymerization induced phase separation (PIPS). In the PIPS process, the polymer phase usually separates from the liquid crystal during polymerization as the polymer chain length increases.

The liquid crystal composition includes a liquid crystal material, a prepolymer composition, and a photoinitiator or thermal initiator. The components are chosen so that they form a single phase until polymerized. The liquid crystal material can be any useful liquid crystal such as, for example, a ChLC material or a nematic liquid crystal material. The liquid crystal material can be present in the composition in any useful amount, for example, from about 60 to about 95 wt. %, or from about 70 to about 95 wt. %, relative to the total weight of the composition.

The prepolymer composition can comprise one or more monomers and/or oligomers. In some embodiments, the prepolymer composition comprises a silane-containing (meth)acrylate monomer and a multifunctional (meth)acrylate monomer. In some embodiments, the prepolymer composition comprises: a silane-containing (meth)acrylate monomer, a (meth)acrylic resin monomer, and a multifunctional (meth)acrylate monomer. The silane-containing monomer can be hydrolyzable or non-hydrolyzable. Illustrative silane-containing monomers include alkoxysilanes and (meth)acryloxysilanes, represented by the formula:

$$R^1_m R^2_p Si(X)_{4-m-p}$$

wherein, $R^1$ is independently a (meth)acryloxy or (meth)acryloxyalkyl group; $R^2$ is independently selected from the group consisting of hydrogen, $(C_1$-$C_{12})$alkyl, $(C_6$-$C_{12})$aryl, or $(C_7$-$C_{17})$arylalkyl; X is a hydrolyzable or non-hydrolyzable group; m is an integer from 1 to 3; and p is 0, 1, or 2 with the proviso that (m+p) is an integer from 1 to 3. Particularly useful silane-containing monomers include (methacryloxymethyl)phenyldimethylsilane, methacryloxypropyl trimethoxysilane, methacryloxypropyl dimethylethoxysilane, methacryloxypropyl trimethylsilane, and monomers described in U.S. Ser. No. 11/557,540 (Roberts, et al.) filed on Nov. 8, 2006.

The multifunctional (meth)acrylate monomer may be represented by the formula:

$$R^3{}_n\text{—}R^4$$

wherein: $R^3$ is independently selected from acryloxy or methacryloxy; $R^4$ is $(C_1\text{-}C_{20})$alkyl or $(C_7\text{-}C_{17})$arylalkyl, optionally containing one or more heteroatomic substitutions independently selected from S, O, Si, or N; and n is an integer from 1 to 4. Useful reactive (meth)acrylate monomers include glycerol derivatives, trimethylopropane derivatives, and pentaerythritol derivatives. Particular examples include trimethylopropane triacrylate, hexanediol dimethacrylate (HDDMA), hexanediol diacrylate, butanediol dimethacrylate, ethylene glycol dimethacrylate, and ethylene glycol diacrylate. Other multifunctional monomers are described in Roberts et al.

The (meth)acrylic resin monomer may comprise an ester, urethane, or (meth)acrylate based polymer or oligomer, bearing one or more reactive (meth)acrylate groups. In some embodiments, the (meth)acrylic resin monomer is a polyalkyl (meth)acrylate having pendant (meth)acrylate groups. For example, the (meth)acrylic resin monomer may comprise a polymer comprising the reaction product of: polymerized units of free radically polymerizable ethylenically unsaturated monomers, and polymerized units derived from an ethylenically unsaturated monomer possessing polymerizable functional groups; these types of materials are described in U.S. Pat. No. 6,448,301 (Gaddam et al.). One particular example of a useful (meth)acrylic resin monomer is a polybutyl methacrylate with pendant or terminal (meth)acrylate groups.

Another (meth)acrylic resin monomer is described in U.S. Pat. No. 6,340,733 (Slark et al.) and may be represented by the formula:

$$X^1\text{-}A_q\text{-}B_r(R^7)\text{—}X^2$$

wherein A represents a residue of at least one (meth)acrylate monomer; B represents a residue of at least one monomer copolymerizable with A; $R^7$ represents a (meth)acrylate functionalized pendant ester group; $X^1$ and $X^2$ represent terminal groups which may be the same or different; and q and r are both at least 1 and are chosen such that the polymer has a number average molecular weight of greater than 2000.

Another useful polyalkyl (meth)acrylate resin monomer is the ELVACITE family of polymers available from Lucite International. These are typically derived from methyl methacrylate, ethyl methacrylate and n-butyl methacrylate monomers. An exemplary example is ELVACITE 4059 which comprises a copolymer of methyl methacrylate and butyl methacrylate.

The prepolymer composition can also include additional monomers such as those represented by the formula:

where $R^5$ is hydrogen or —$CH_3$; and $R^6$ is $(C_1\text{-}C_{12})$alkyl, $(C_6\text{-}C_{12})$aryl, or $(C_7\text{-}C_{17})$arylalkyl.

The photoinitiator can comprise any useful photoinitiator. In some embodiments, the photoinitiator includes hydroxyalkylbenzophenones (e.g., DAROCUR available from Merck), benzoin ethers, alkylphenones, benzophenones, xanthones, thioxanthones, phosphine oxides (e.g., IRGACURE 819 available from Ciba Specialty Chemicals), substituted alpha-ketols, aromatic sulfonyl chlorides, photoactive oximes, or their derivatives. Additional useful photoinitiators are described in U.S. Pat. No. 5,516,455. Suitable thermal initiators which may be utilized include, but are not limited to, those selected from azo compounds, such as 2,2'-azobis (isobutyronitrile); hydroperoxides, such as tert-butyl hydroperoxide; and, peroxides, such as benzoyl peroxide and cyclohexanone peroxide. The photoinitiator or thermal initiator can be present in the composition in any useful amount, such as from 0.01 to 10 wt. %, from 0.1 to 5 wt. %, or from 1 to 2 wt. %.

One exemplary liquid crystal composition includes from 60 to 95 wt. % liquid crystal material, from 5 to 40 wt. % prepolymer composition, and from 0.1 to 5 wt. % photoinitiator with respect to the prepolymer composition. In this example, the prepolymer composition includes from 60 to 85 wt. % of silane-containing monomer, from 5 to 30 wt. % of multifunctional (meth)acrylate monomer, and from 5 to 30 wt. % of (meth)acrylic resin monomer.

Another exemplary liquid crystal composition includes from 70 to 95 wt. % liquid crystal material, from 5 to 30 wt. % prepolymer composition, and from 0.1 to 5 wt. % photoinitiator with respect to the polymer precursor. In this example, the prepolymer composition includes 40 to 95 wt. % of silane-containing monomer, from 0.05 to 65 wt. % of multifunctional (meth)acrylate monomer, and from 5 to 55 wt. % of (meth)acrylic resin monomer.

The liquid crystal composition may comprise particles having a diameter of from about 1.5 to about 10 μm. The particles may be used to "set" the inner cell gap such that it is substantially the same as the diameter of the particles. Useful particles include polymer particles.

In general, the inner cell gap depends upon a number of factors including the maximum reflection desired given reasonable drive voltages. The maximum reflection obtainable for a given set of drive voltage conditions can, in turn, depend on a number of factors such as the birefringence of the liquid crystal material. Other factors include the quality of the phase separation of the liquid crystal from the polymer matrix. The inner cell gap can range from about 1 to about 15 μm. In some embodiments, the inner cell gap is from about 1.5 to about 10 μm, or from about 2 to about 6 μm.

The sealant may comprise any material useful for forming a seal with the first and second substrates, as well as for bonding the first and second substrates together. Generally, the sealant is optically clear. Exemplary sealants include pressure sensitive adhesives such as acrylic pressure sensitive adhesives and silicone-based pressure sensitive adhesives. The silicone-based PSA generally includes a gum and a resin. The gum is typically a soft, linear siloxane polymer with a —$Si(R_2)O$— (R=methyl or phenyl) backbone. The resin is typically a hard, highly branched/crosslinked product made from a hydrolyzed tri- or quadra-functional silane ($CH_3SiCl_3$ or $SiCl_4$) core, end capped with monofunctional silanes, such as $(CH_3)_3SiCl$. A suitable resin includes, for example, GE SR1000 MQ Resin (polytrimethylhydrosilyl-silicate) commercially available from General Electric Company.

The siloxane gum and resin material may be dissolved in a solvent, e.g., an organic aromatic solvent such as toluene or xylene, COMSOLVE 150 solvent commercially available from commerce Industrial Chemical, Inc., or a glycol ether such as butyl CELLOSOLVE acetate or butyl CARBITOL acetate solvent commercially available from Union Carbide Corporation. In some embodiments, the solvent is a relatively high boiling or a relatively slow evaporating solvent that evaporates slower than any toluene or xylene that may be present in the PSA. The siloxane gum and resin material (and solvent) can be further cured by a catalyst including a peroxide, e.g., benzoyl peroxide, 2,4-dichlorobenzoyl peroxide, and PERKADOX organic peroxide commercially available from Akzo Chemie Nederland B.V., to increase the cohesive strength and temperature resistance of the dried adhesive. When a solvent is used, it may be evaporated at any time after the adhesive solution is applied.

In some embodiments, pressure sensitive adhesives in the form of a tape may be used. Such tapes include adhesive transfer tapes such as 3M™ Optically Clear Adhesives 8171 and 8172, both available from 3M™ Company in a variety of custom sizes, and having thicknesses of 25 µm and 50 µm, respectively.

Another exemplary adhesive comprises an optically clear, compatibilized blend of a pressure sensitive adhesive, a high Tg polymer, and a crosslinker. Such blends are described in US 2004/0202879 A1 (Xia et al.). A useful blend may comprise from about 70 to about 90 wt. % of a pressure sensitive adhesive component comprising at least one polymer with an acid or base functionality, from about 10 to about 30 wt. % of a high Tg polymer having a weight average molecular weight greater than 100,000 and with acid or base functionality, and from about 0.01 to about 5 wt. % a crosslinker, wherein the functionalities of the PSA component and the high Tg polymer form an acid-base interaction when mixed. In some embodiments, the PSA comprises a copolymer with a weight average molecular weight of less than about 800,000 and is formed from free-radically polymerizable monomers selected from the group of (meth)acrylates, vinyl monomers, and mixtures thereof. In some embodiments, the Tg of the high Tg polymer is greater than about 25° C., or greater than 50° C., and can comprise a monomer selected from the group consisting of vinyl esters, (meth)acrylamide, styrenes, (meth)acrylonitriles, substituted styrenes, vinyl halides, vinyl propionate, (meth)acrylates, and mixtures thereof. As used herein, (meth)acryl terminology refers to both acryl and methacryl functionalities. The crosslinker may be selected from the group consisting of aziridines, peroxides, benzophenones, triazines, ethylenically unsaturated trialkoxy silanes, multifunctional (meth)acrylates, isocyanates, epoxies, and mixtures thereof.

Useful adhesives also include photocurable and thermally curable materials. Exemplary curable materials include urethane (meth)acrylate-based liquids such as Ultra Light-Weld® 3-230741 which is a solvent free UV/Visible curable adhesive sold by Dymax Corporation, mixtures of polyester and aromatic epoxy resins such as DENATITE UV resin XNR5516Z-SA1 which is a mixture of polyester and aromatic epoxy resins together with catalytic triarylsulfonium hexafluoroantimonate and 6.0 µm spacer beads (Nagase ChemteX Corporation), and (meth)acrylate-based adhesives such as NORLAND 68 (NOA8) which is a liquid UV-curable photopolymer sold by Norland Products Inc.

The sealant may comprise particles in order to set the cell gap. Useful particles may include poly(divinylbenzene), polystyrene, glass or other particles have a diameter of from about 1.5 to about 200 µm.

The particular sealant used may depend on a variety of factors, e.g., the particular design of the cell, the desired size of the outer sealant region, and the desired performance of the cell in a particular environment. In some embodiments, it may be desirable for the sealant to have little or no detrimental effect on other components of the cell. For example, it may be desirable for the sealant to have little or no detrimental effect on the electronic components of the cell such as the conductive material which may be present on one or both of the substrates. The sealant may be selected by subjecting the cell to appropriate environmental testing, typically elevated temperature and humidity conditions as described above. Color shifts can be measured by recording reflectance spectra of the planar state both before and after testing. For a given display, the amount of color shifting can then be used to decide if the sealant is adequate, depending on acceptable product specifications.

The outer cell gap may be anywhere from about 6 µm to about 200 µm depending on any number of factors described herein. In some embodiments, the outer cell gap may be from about 6 µm to about 100 µm, or from about 6 µm to about 50 µm. The outer cell gap may be essentially a single distance, or the distance may vary. In some embodiments, it may be useful for the outer cell gap to be from about 1 to about 70 times the inner cell gap. As described above, two or three different cell gaps may exist, e.g., the inner cell gap and the void cell gap may be the same, with a smaller or larger outer cell gap.

The sealant may be used in a cell construction such as the one shown in FIG. 2. That is, the sealant may be disposed between the two substrates with little or no sealant visible outside of the cell. The amount of sealant used in this type of construction may depend on how much outer sealant region is available for sealing the display as well as the desired outer cell gap. In some embodiments, for this type of construction, transfer tapes and liquid-type adhesives such as curable adhesives may be used. In some embodiments, a method of making the liquid crystal display comprises: applying an adhesive to an outer sealant area of a first substrate, contacting the adhesive with a second substrate such that an adequate seal is formed and the first and second substrates are bonded together, and disposing a liquid crystal composition in a cell gap formed by the first and second substrates such that the liquid crystal composition does not contact the sealant. At any point during the process, lamination may be used to further create the desired seal and improve bonding, as well as to set the gap(s) of the display. Further, if a curable adhesive is used, it may be cured at any point during the process. The adhesive may also be applied to the second substrate instead of the first, followed by contacting the adhesive with the first substrate instead of the second. The construction shown in FIG. 2 can also be prepared by disposing the liquid crystal composition onto the first or second substrate before or after the adhesive is applied. With the liquid crystal composition and adhesive disposed on the first or second substrate, the other substrate can then be placed in contact with the adhesive. In this case, care must be taken so that the liquid crystal composition and the sealant do not contact each other at any time.

Figure 3:
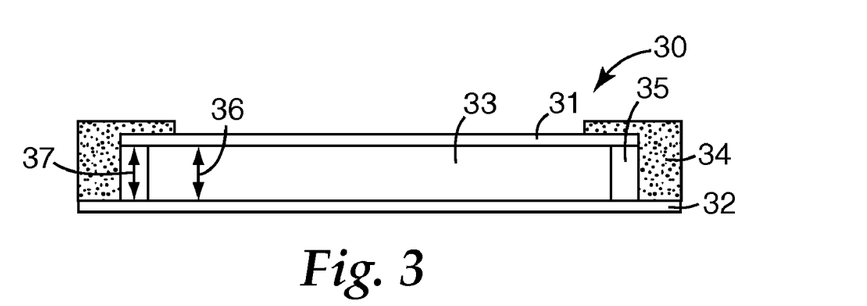

The sealant may be used in a cell construction such as the one shown in FIG. 3. In this embodiment, liquid crystal display 30 comprises sealant 34 disposed on an outer surface of the first substrate 31 and an inner surface of the second substrate 32. Although not shown, the first and second substrates may be of the same width and/or length, such that the adhesive would be applied to outer surfaces of both substrates. The amount of sealant used in this type of construction may depend on how much outer sealant region is available for sealing the display as well as the desired outer cell gap. In some embodiments, for this type of construction, liquid-type adhesives such as curable adhesives may be used. In some embodiments, a method of making the liquid crystal display comprises: providing first and second substrates; adhering the first and second substrates together using a sealant, wherein the first and second substrates are separated by a cell gap; disposing a liquid crystal composition 33 into the cell gap such that the liquid crystal composition does not contact the sealant and a void region 35 is formed. At any point during the process, lamination may be used to further create the desired seal and improve bonding, as well as to set the gap(s) of the display. Further, if a curable adhesive is used, it may be cured at any point during the process. The construction shown in FIG. 3 can also be prepared by disposing the liquid crystal composition onto the first or second substrate before the adhesive is applied. With the liquid crystal composition disposed on the first or second substrate, the other substrate can then be placed in contact with the liquid crystal composition. The adhesive can then be applied to the substrates. FIG. 3 shows inner cell gap 36 and void cell gap 37 as being the same, although this need not always be the case.

Figure 4:
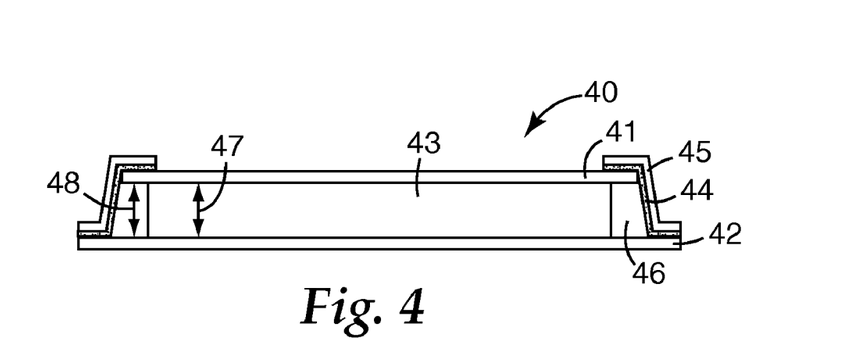

The sealant may be used in a cell construction such as the one shown in FIG. 4. Liquid crystal display 40 utilizes a sealant in the form of a tape comprising adhesive 44 disposed on backing 45. The tape may be disposed on an outer surface of the first substrate 41 and an inner surface of the second substrate 42. Although not shown, the first and second substrates may be of the same width and/or length, such that the tape would be applied to outer surfaces of both substrates. The amount of tape used in this type of construction may depend on how much outer sealant region is available for sealing the display. In some embodiments, a method of making the liquid crystal display comprises: providing first and second substrates; adhering the first and second substrates together using a tape, wherein the first and second substrates are separated by a cell gap and the tape comprises a pressure sensitive adhesive coated on a backing; disposing a liquid crystal composition 43 into the cell gap such that the liquid crystal composition does not contact the tape and a void region 46 is formed. At any point during the process, lamination may be used to further create the desired seal and improve bonding, as well as to set the gap(s) of the display. The construction shown in FIG. 4 can also be prepared by disposing the liquid crystal composition onto the first or second substrate before the tape is applied. With the liquid crystal composition disposed on the first or second substrate, the other substrate can then be placed in contact with the liquid crystal composition. The tape can then be applied to the substrates. FIG. 4 shows inner cell gap 47 and void cell gap 48 as being the same, although this need not always be the case.

The liquid crystal composition forms a bistable reflective cholesteric liquid crystal display. Application of an electric field (E) across the conductive inner surfaces causes the liquid crystal to be aligned in either the reflective PL state or the scattering FC state. Both of these states are stable at E=0, thus the textures are locked in and will remain intact until acted upon again (i.e., the device is bistable). Switching from the PL to the FC state requires a low voltage pulse while the return from FC to PL requires a higher voltage pulse to drive the device into a homeotropic state which then relaxes to the final planar state. Desirable voltages for switching the device from FC to PC are less than about 100 V, or less than about 60 V. An illustrative drive scheme for switching single pixel cholesteric liquid crystal display (i.e., ChLCD) cells is described by Deng-Ke Yang, et al. (Annu. Rev. Mater. Sci. 1997, 27, 117-146). According to reflectance versus voltage plots described in Yang, et al., ChLCD cells can be switched to a voltage value $V_5$ at which the cell is in the PL state or $V_2$ at which point the cell is in the FC state. The associated pulse trains (frequency and amplitude) can be practiced by one of ordinary skill in the art.

Exemplary compositions described in the pending disclosure herein give corresponding stable planar state reflection. By stable state reflection it is meant that after being driven to the planar state by a voltage $V_5$ the cell experiences no loss of reflection after standing at ambient conditions for about three days.

Liquid crystal display assemblies may be made using the liquid crystal display disclosed herein. The assembly comprises at least two light reflecting liquid crystal displays of different color, wherein at least one of the displays comprises the liquid crystal display disclosed herein. An assembly could be made by stacking the displays on top of one another. Useful color combinations include two and three combinations of red, green, blue, cyan, magenta, yellow, black, and white.

The first and second substrates may be adhered together on a roll-to-roll apparatus. In one embodiment, in-situ deposition of the photocurable adhesives during the roll to roll process may be utilized. Useful photocurable adhesives may be comprised of a one- or two-part system. The adhesives may also be thermally curable. Optimized adhesives bond to the substrate with ITO coating, resulting in 180 degree peel strength greater than about 40 g/cm (100 g/inch). The adhesive and the liquid crystal composition may be substantially matched according to their rheological properties. A mismatch of viscosities may result in uneven exertion of pressure on the nip roll. Higher viscosity materials exert greater pressure on the nip rolls resulting in thicker coatings.

Roll-to-roll fabrication may require the simultaneous dispensing of the adhesive and the liquid crystal composition. The ability to control the adhesive thickness during this process is typically desirable. In this case, a mismatch in coating thickness between these two materials may not be desirable, otherwise inconsistent cross-web device thickness and corresponding inhomogeneous reflectance may result. Spacer beads may be used to set the cell gap. Material viscosity, nip roll type, and nip roll pressure may be optimized to laminate a combination of an adhesive and liquid crystal composition with consistent cross web thickness.

The adhesive may be dispensed by lamination methodology where at least one of the lamination rolls may be deformable. Roll deformability may be typically measured by a durometer value, for example, according to ASTM D2240-00. These units take values from 1 to 100 where the higher values indicate a harder material. Durometer is a dimensionless quantity, and there is no simple relationship between a material's durometer in one scale, and its durometer in any other scale, or by any other hardness test. No restriction is made on the durometer value for roll deformability. The particular hardness may be chosen according to the roll-to-roll line speed, the viscosity of the material being dispensed, and the nip pressure.

In the manufacturing process, two streams of the adhesive may be deposited on either side of the liquid crystal composition. The liquid streams may be dispensed through needles under a positive pressure provided by a syringe pump. The widths of the streams are controlled by the pressure applied to the syringe pumps. For example, doubling the flow rate leads to a doubling of the adhesive coating width. The ITO-liquid crystal composition-ITO laminate leaves the lamination stage, before heading to the low-power UV-curing station.

A multi-chambered edge dam may be used in a roll-to-roll process. In this embodiment, the two inner edge guides would create a central well in which the liquid crystal composition may be dispensed and two border wells in which an adhesive may be dispensed. The inner edge dams can be moved in the direction of the laminator rolls' widths, giving control of the widths of the adhesive stripes and the liquid crystal composition. The outer edge guides could be designed to move but could also be fixed.

The described processes may be advantageous in improving the integrity of fabricated liquid crystal displays. Delamination may be prevented thus enabling the cured material to be wound up resulting in a true roll-to-roll process. The process may be also beneficial during the subsequent singulation process. Zone deposition and photo curing of adhesives allows for singulation along the cured adhesive stripe without delamination. Zone deposition of adhesive prevents flow of the PIPS formulation across the adhesive boundary. The partitioning of the PIPS formulation allows for processing of multi colored single devices.

In one example, Dymax Ultra Light-Weld 3-20741 adhesive was laminated on PET in a wide patch (upper substrate 51 μm (2 mils) thick; lower substrate 127 μm (5 mils) thick), and cured with an H-bulb at the end of the line while the line was run at 5-7 m/min. A one-inch wide sample was cut from the wide adhesive patches and peel test was then conducted using a SP-2000 Peel Test instrument. Peel strength (180 degree) was found to be 85.8 g/mm (2179 g/inch). Dynamax Ultra Weld 3-20747 and a liquid crystal composition similar to Compositions 1-8 described below were simultaneously coated between two substrates (upper substrate 51 μm (2 mils) thick; lower substrate 127 μm (5 mils) thick). Cure was conducted utilizing an H-bulb. At a rate of 0.75 mL/min, the adhesive had a width of about 40 mm, and at a rate of about 1.0 mL/min, a width of about 78 mm was obtained.

EXAMPLES

Preparation of Prepolymers 1 and 2

Into an opaque vial fitted with a screw-cap was introduced 1.34 g of (methacryloxymethyl)phenyldimethylsilane (MMPDMS) from Gelest, Inc., 0.28 g of a UV-curable acrylic resin (Elvacite® 4059 from Lucite International, Inc.), and 0.38 g of hexanediol dimethacrylate (HDDMA) from Sartomer Co., Inc. The vial was capped and shaken mechanically until the next day to give a homogenous solution. To this was added 0.03 g of photoinitiator (Irgacure® 819 from Ciba Specialty Chemicals). The vial was again capped and shaken until the photoinitiator had dissolved. This gave Pre-polymer 1. Pre-polymers 2 and 3 were made similarly using the amounts shown in Table 1.

TABLE 1

| Monomer | Prepolymer 1 (wt. %) | Prepolymer 2 (wt. %) | Prepolymer 3 (wt %) |
| --- | --- | --- | --- |
| MMPDMS | 66.0 | 63.1 | 60.1 |
| Elvacite ® 4059 | 13.8 | 13.8 | 13.8 |
| HDDMA | 18.7 | 21.7 | 24.6 |
| Irgacure ® 819 | 1.5 | 1.5 | 1.5 |

Preparation of $ChLC_{\lambda=546}$

A mixture of a blue reflecting cholesteric LC and a chiral dopant was prepared by mixing together 82 mass % of MDA-01-1955 and 18 mass % MDA-00-3506, both experimental materials obtained from Merck KGaA. The pure cholesteric LC had an optical anisotropy (Δn) of 0.26 and a dielectric anisotropy (Δε) of +41.6. This mixture is referred to as $ChLC_{\lambda=546}$ where λ is the reflection wavelength.

Preparation of ChLC/Prepolymer Compositions 1-8

Into a vial fitted with a screw-cap was introduced 1.57 g of $ChLC_{\lambda=546}$, 0.401 g of Prepolymer 1, and 0.035 g of poly (divinylbenzene) microspheres having a 4.0 μm diameter (MICROPEARL SP from Sekisui Chemical Co., Ltd.). This mixture was sonicated for 15 minutes immediately before further processing to give Composition 1 which appeared homogeneous. Compositions 2-8 were made similarly using microspheres having different diameters as shown in Table 2.

TABLE 2

| Composition | $ChLC_{\lambda=546}$ (wt. %) | Prepolymer 1 (wt. %) | Diameter Microspheres (um) | Microspheres (wt. %) |
| --- | --- | --- | --- | --- |
| 1 | 78.3 | 20.0 | 4.0 | 1.7 |
| 2 | 78.3 | 20.0[2] | 4.0 | 1.7 |
| 3 | 78.0 | 19.5 | 2.25 | 2.4 |
| 4 | 78.0 | 19.5 | 3.0 | 2.4 |
| 5 | 78.0 | 19.5 | 4.0 | 2.4 |
| 6 | 78.0 | 19.5 | 6.0 | 2.4 |
| 7 | 78.0 | 19.5 | 8.0 | 2.4 |
| 8 | 78.0 | 19.5 | 10.0 | 2.4 |
| 9 | 78.3 | 20.0[3] | 3.0 | 1.7 |

[2]Prepolymer 2
[3]Prepolymer 3

Substrates

The substrates used were obtained from 3M Touch Systems (3M Company in Milwaukee, Wis.). One substrate of each device contained twelve pixels of patterned ITO on a PET support. This pixilated substrate measured 14.2 cm×5.1 cm×0.013 cm and contained a 12-pixel design of 200 Ω/square ITO. The 12-pixel design comprised two rows of six pixels with each pixel dimension being 1.27 cm×1.91 cm. Each pixel contained an additional 0.64 cm square contact pad. The other substrate of each device comprised a single common electrode of 200 Ω/square ITO and having dimensions of 15.5 cm×3.5 cm×0.013 cm on a PET support.

Testing & Evaluation

Each of the cells described below were tested for environmental stability using a temperature/humidity chamber (Model SM-5.5S from Thermatron Industries).

The electro-optical characteristics of each cell were obtained both before and after environmental testing by use of a conventional drive scheme as disclosed in Khan, et al. (SID Symposium Digest 2004, 35, 886).

Reflection data were obtained by measurement with a SP62 spectrophotometer (X-Rite Inc.) in the D50/2° observer mode. All cells were placed in a black background and their focal conic (FC) and planar state (PL) reflectance spectra recorded. Contrast ratio (CR=PL/FC) measurements were calculated by the reflectance ratio at maximum PL reflectance.

Example 1

FIG. 2 Configuration

Two 12-pixel substrates described above were laminated along the two longer edges with a double sided transfer tape PSA (2 mm-wide 3M™ Optically Clear Adhesive 8171) having a thickness of 25 μm. Into this "tube" was introduced Composition 1. The cell was passed through a laminator and the excess material that exited the tube was wiped away. The cell was subjected to curing under a GE Black light at 1.20 mW/cm² for 15 minutes. There was observed a distinct void region between the cured material and the PSA. The cell was subjected to 85° C./85% RH for 621 hours. No visible blue sifting of the reflective planar state was observed.

Comparative Example 1

FIG. 1 Configuration

Composition 1 was applied between two 12-pixel substrates described above. substrates. The cell was laminated and the excess formulation wiped away. Curing was conducted under a GE Black light at 1.20 mW/cm$^2$ for 15 minutes. The cell was subjected to 85° C./85% RH for 621 hours. The sample showed blue coloration extending 0.75 cm into the cell from the air-composition interphase.

Comparative Example 2

FIG. 3 Configuration with No Void

Composition 2 was applied between two 12 pixel substrates described above. The cell was laminated and the excess formulation wiped away. Curing was conducted under a GE Black light at 1.20 mW/cm$^2$ for 15 minutes. The cell was then sealed by treatment with a solvent-free liquid UV-curable adhesive (Ultra Light-Weld® 3-230741 from Dymax Corp.) along its two longer edges. The adhesive seeped about 1.0 mm into the cell contacting the cured Composition 2. The LC cell region was masked from the uncured adhesive which was then cured for 6 minutes at 15 mW/cm$^2$. The cell was placed in an environmental chamber at 65° C./95% RH for 247 hours. Switching of the cell to the planar state showed a color shift to blue. The blue color was first observed at adhesive-cell boundary.

Comparative Example 3

FIG. 3 Configuration with No Void

The ChCLD cell of Comparative Example 3 was constructed under identical conditions as Comparative Example 2 except that a clear, colorless, liquid UV-curable adhesive (Norland 68 NOA68) was used. The cell was exposed to 65° C./95% RH for 247 hours. Switching of the cell to the planar state showed a color shift to blue. The blue color was first observed at adhesive-cell boundary.

Comparative Example 4

FIG. 1 Configuration

The ChCLD cell of Comparative Example 4 was constructed under identical conditions as Comparative Example 2 except that no adhesive was used. The cell was exposed to 65° C./95% RH for 247 hours. The results indicate similar blue shifting of the planar state reflection at the air-ChLC boundary. The blue shifting of the reflective state color was however less that that observed for Comparative Examples 2 and 3.

Example 2

FIG. 2 Configuration

Two 12-pixel substrates described above were laminated along the two longer edges with a double sided transfer tape PSA (2 mm-wide 3M™ Optically Clear Adhesive 8171 of thickness 25 μm). Into this "tube" was introduced Composition 2. The cell was passed through a laminator and the excess material that exited the tube was wiped away. The cell was subjected to curing under a GE Black light at 1.20 mW/cm$^2$ for 15 minutes. There was observed a distinct void region between the cured composition and the PSA. The cell was subjected to 15 hours at 120° C. then to 165 hours at 100° C. No visible blue sifting of the reflective planar state was observed.

Comparative Example 5

FIG. 1 Configuration

The ChCLD cell of Comparative Example 5 was constructed under identical conditions as Comparative Example 2 except that no adhesive was used. The cell was subjected to 96 hours at 80° C.; blue shifting of the planar state reflection at the air-ChLC boundary was observed. The cell was then subjected to 13.5 hours at 120° C.; significant blue coloration was observed.

Comparative Example 6

FIG. 4 Configuration with No Void

Composition 2 was applied between two 12 pixel substrates described above. The substrate was laminated and the excess formulation wiped away. Curing was conducted under a GE Black light at 1.20 mW/cm$^2$ for 15 minutes. The cell was then sealed using a polyimide film tape (3M 5413 from 3M Company) as shown in FIG. 4, except that no void existed. In particular, the polyimide tape overlaped the edge of the upper continuous ITO substrate and the ITO pad region of the lower pixilated substrate. The cell was subjected to 96 hours at 80° C.; blue shifting of the planar state reflection at the air-ChLC boundary was observed. The cell was then subjected to 13.5 hours at 120° C.; significant blue coloration was observed.

Example 3

FIG. 2 Configuration

Two 12-pixel substrates described above were laminated along the two longer edges with DENTATITE UV resin containing 6-micron spacer, available from Nagase Chemtex Corporation, Osaka, Japan. The width of the adhesive was approximately 7 mm. The two strips of adhesive were exposed to 27 mW/cm$^2$ for 5 minutes. Into this "tube" was introduced Composition 9. The cell was passed through a laminator and the excess material that exited the tube was wiped away. The cell was subjected to curing under a GE Black light at 1.20 mW/cm$^2$ for 15 minutes. There was observed a distinct void region between the cured material and the adhesive. The cell was subjected to 85° C./85% RH for 639 hours. No visible blue shifting of the reflective planar state was observed.

Optimization of Cell Gap Region

Compositions 3-8 were each applied between two 12-pixel substrates described above. Each cell was laminated and the excess formulation wiped away. Curing was conducted under a GE Black light at 1.20 mW/cm$^2$ for 15 minutes. For each sample, the electro-optic profile was recorded according to a drive scheme similar to that described in Khan et al. Results are shown in Table 3. It was observed that the cell gap region of 3 μm for the ChLCD cell corresponding to Composition 4, yields an optimum contrast ratio, with minimum operating voltage and was multiplexable.

TABLE 3

| Composition | Spacer bead size (um) | $V_1$ | $V_2$ | $V_3$ | $V_4$ | $V_5$ | $V_6$ | $FC_{560\,nm}$ | $CR_{560\,nm}$ |
|---|---|---|---|---|---|---|---|---|---|
| 3 | 2.25 | 2 | 6 | 11 | 12 | 15 | 36 | 6.35 | 4.3 |
| 4 | 3 | 3 | 10 | 18 | 19 | 23 | 37 | 6.84 | 4.6 |
| 5 | 4 | 4 | 13 | 24 | 25 | 29 | 35 | 7.39 | 4.4 |
| 6 | 6 | 5 | 19 | 34 | 36 | 43 | 46 | 8.57 | 3.6 |
| 7 | 8 | 8 | 24 | 44 | 46 | 54 | 63 | 9.83 | 3.2 |
| 8 | 10 | 10 | 30 | 56 | 56 | 71 | 85 | 9.57 | 3.6 |

Optimization of Adhesive Cell Gap Region for Configuration B

Three pairs of 12-pixel substrates were laminated along the two longer edges, each with a transfer tape comprising a PSA (2 mm-wide 3M™ Optically Clear Adhesive 8171) having thicknesses 6.25, 12.5 and 18.75 μm. Into each "tube" was introduced Composition 1. The cells were separately passed through a laminator and the excess material that exited the tube was wiped away. The cells were subjected to curing under a GE Black light at 1.20 mW/cm² for 15 minutes. There was observed a distinct void region between the ChLC material and the PSA for all cells. At 6.25 and 12.5 μm spacing there were observed areas (15%, 22% of total void region length respectively) where the void region had been breached by Composition 1. For the cell of 18.75 μm, this defect was minimal (2% of void region length).

All cells were placed in a humidity chamber held at 85° C./85% RH for 1063 hours. Periodically, the cells were withdrawn and the optical properties of the planar and focal conic states determined. In particular, the following observations were made for each of the three cells:

After 66 hrs, the areas of adhesive-Composition 1 contact acted as nucleation sites for color shifting of the planar state reflection. The progression of color change was green to saturated green to blue.

After 262 hrs, the blue shifting of color increased beyond the nucleation site.

After 1063 hrs, some of the color shifted area became transparent even in the planar state.

As described above for Example 1 having a spacing of 25 μm, no visible blue sifting of the reflective planar state was observed.

What is claimed is:

1. A liquid crystal display comprising first and second opposing substrates that are separated by a cell gap, the cell gap comprising:
    an inner liquid crystal region comprising a liquid crystal composition,
    an outer sealant region comprising a sealant that bonds the first and second opposing substrates together, and
    a void region between the inner liquid crystal region and the outer sealant region, the void region formed by the liquid crystal composition and the sealant, wherein the liquid crystal composition is photocurable or thermally curable, and the composition comprises a prepolymer composition, the prepolymer composition comprising:
    a silane-containing (meth)acrylate monomer, and
    a multifunctional (meth)acrylate monomer.

2. The liquid crystal display of claim 1, an inner gap formed by the inner liquid crystal region, an outer gap formed by the outer sealant region, and the outer gap is greater than or equal to the inner gap.

3. The liquid crystal display of claim 1, wherein the sealant is a pressure sensitive adhesive.

4. A liquid crystal display comprising first and second opposing substrates that are separated by a cell gap, the cell gap comprising:
    an inner liquid crystal region comprising a liquid crystal composition,
    an outer sealant region comprising a sealant that bonds the first and second opposing substrates together, and
    a void region between the inner liquid crystal region and the outer sealant region, the void region formed by the liquid crystal composition and the sealant, wherein the liquid crystal composition is photocurable or thermally curable, and the composition comprises a prepolymer composition, the prepolymer composition comprising:
    a silane-containing (meth)acrylate monomer,
    a (meth)acrylic resin monomer, and
    a multifunctional (meth)acrylate monomer.

5. The liquid crystal display of claim 4, an inner gap formed by the inner liquid crystal region, an outer gap formed by the outer sealant region, and the outer gap is greater than or equal to the inner gap.

6. The liquid crystal display of claim 4, wherein the sealant is a pressure sensitive adhesive.

7. A liquid crystal display comprising first and second opposing substrates that are separated by a cell gap, the cell gap comprising:
    an inner liquid crystal region comprising a liquid crystal composition,
    an outer sealant region comprising a sealant that bonds the first and second opposing substrates together, and
    a void region between the inner liquid crystal region and the outer sealant region, the void region formed by the liquid crystal composition and the sealant, wherein the liquid crystal composition is photocured or thermally cured, and the composition comprises the cured reaction product of a prepolymer composition, the prepolymer composition comprising:
    a silane-containing (meth)acrylate monomer, and
    a multifunctional (meth)acrylate monomer.

8. The liquid crystal display of claim 7, an inner gap formed by the inner liquid crystal region, an outer gap formed by the outer sealant region, and the outer gap is greater than or equal to the inner gap.

9. The liquid crystal display of claim 7, wherein the sealant is a pressure sensitive adhesive.

10. A liquid crystal display comprising first and second opposing substrates that are separated by a cell gap, the cell gap comprising:
    an inner liquid crystal region comprising a liquid crystal composition,
    an outer sealant region comprising a sealant that bonds the first and second opposing substrates together, and
    a void region between the inner liquid crystal region and the outer sealant region, the void region formed by the liquid crystal composition and the sealant,
wherein the liquid crystal composition is photocured or thermally cured, and the composition comprises the cured reaction product of a prepolymer composition, the prepolymer composition comprising:
    a silane-containing (meth)acrylate monomer,
    a (meth)acrylic resin monomer, and
    a multifunctional (meth)acrylate monomer.

11. The liquid crystal display of claim 10, an inner gap formed by the inner liquid crystal region, an outer gap formed by the outer sealant region, and the outer gap is greater than or equal to the inner gap.

12. The liquid crystal display of claim 10, wherein the sealant is a pressure sensitive adhesive.

* * * * *